United States Patent [19]

Jenkins

[11] 4,322,618

[45] Mar. 30, 1982

[54] DIFFRACTED BEAM MONOCHROMATOR

[75] Inventor: Ronald Jenkins, Peekskill, N.Y.

[73] Assignee: North American Philips Corporation, New York, N.Y.

[21] Appl. No.: 217,740

[22] Filed: Dec. 18, 1980

Related U.S. Application Data

[63] Continuation of Ser. No. 1,104, Jan. 5, 1979, abandoned.

[51] Int. Cl.[3] .......... G01M 23/20

[52] U.S. Cl. .......... 250/272

[58] Field of Search .......... 250/272, 273, 274, 275, 250/280, 505

[56] References Cited

U.S. PATENT DOCUMENTS 3,327,114 6/1967 Diorio .......... 250/275

3,852,594 12/1974 Paolini .......... 250/272

*Primary Examiner*—Craig E. Church

*Attorney, Agent, or Firm*—Norman N. Spain

[57] ABSTRACT

Disclosed is an x-ray monochromator assembly comprising a receiving slit, a collimator and a monochromator crystal. The collimator is mounted so as to be selectively removable from the x-ray beam.

10 Claims, 3 Drawing Figures

DIFFRACTED BEAM MONOCHROMATOR

This is a continuation of application Ser. No. 1,104, filed Jan. 5, 1979 now abandoned.

BACKGROUND OF THE INVENTION

This invention relates to an x-ray monochromator assembly for focussing a monochromatic beam of diffracted x-radiation at a detector.

The diffracted beam monochromator is a particularly useful attachment to the routine powder diffractometer due to its ability to remove scattered primary white radiation and specimen fluorescence. Although, when used with suitable apertures, the band pass of the graphite crystals typically employed in these monochromators is sufficient to reject diffracted radiation, they are not good enough to resolve, for example CuK $\alpha_1$ from CuK $\alpha_2$. The major advantage of graphite crystals over crystals such as LiF (200) or quartz (1011) lies in its high diffraction efficiency. This high efficiency stems from the extremely mosaic nature of pyrolytic graphite which mosaicity also is the reason for the rather wide band pass. (See "Introduction To X-Ray Spectrometry" - by Ronald Jenkins, Heyden, London, 1976, page 84). Thus, diffracted beam monochromators employing graphite crystals are typically considered as means of partial monochromatization.

Before the advent of the graphite crystal, monochromators were generally supplied with a LiF (200) crystal. Use of such a monochromator causes a loss of some 80% of the intensity of the characteristic diffracted beam and consequently every attempt was made to reduce further loss of efficiency of the device. As an example, no collimator was employed between specimen and detector. The lack of such collimation causes some deterioration of the diffracted beam profile distribution due to the increased axial divergence of the beam. Earlier monochromators were also provided with the capability of working with different wavelengths and suitable adjustments would allow their use with most of the target materials used in diffractometry. With the modern trend to the use of high specific intensity, fine-focus copper anode tubes for most routine applications in inorganic and mineral analysis, the need for this versatility with its associated mechanical constraints has diminished.

Although the use of the collimator results in a highly improved profile shape of the diffracted beam, still some loss in beam intensity occurs thus resulting in reduced counting rate efficiency when it is employed.

Since under some circumstances, good profile shape rather than counting rate efficiency is important while under other circumstances counting rate is more important it is desirable to have a monochromator in which the collimator may be moved in and out of position in the path of the diffracted beam without changing the position of the crystal monochromator.

A special problem in the alignment of this type of diffractometer configuration is the accurate setting of the specimen to receiving slit distance, which adjustment is best done with the x-ray path energized.

SUMMARY OF THE INVENTION

It is an object of this invention to provide a monochromator assembly in which a collimator may be readily moved out of the diffracted beam without disturbing the monochromator crystal.

It is an additional object of this invention to allow easy adjustment of the specimen to receiving slit distance.

According to the invention a novel crystal monochromator assembly is provided which is particularly useful for monochromatizing a diffracted beam of x-radiation in which a collimator is employed which may be moved in and out of position of the diffracted beam without disturbing the monochromator crystal.

Additionally, a simple means is provided for adjusting the receiving slit to specimen distance while the x-ray path is energized.

The monochromator assembly of the invention comprises firstly a base having a first and second essentially linear portions joined together at an oblique angle, with a support member extending transversely outwardly from the base for supporting a monochromator crystal in the path of the diffracted beam. An additional support member also extends transversely outwardly from the base and has a channel for supporting a collimator such as a parallel plate assembly in the path of the diffracted beam. The collimator is supported in the channel in such a manner that it is slidably removable from the path of the diffracted beam.

In an embodiment of the invention the monochromator assembly also comprises a support member for a receiving slit assembly which support member also extends transversely outwardly from said base and similarly to the support for the collimator has a channel from which the receiving slit assembly is slidably removable from the path of the diffracted beam.

This embodiment may be modified, according to the invention, in that the support for the receiving slit assembly is movable along the base.

In addition according to still another embodiment of the invention a single support member, movable along the base, supports both the receiving slit assembly and the collimator.

In a preferred embodiment of the invention the movable support is positioned between two post members which are rigidly secured to the base, the support being movable between the two post members along the base.

In an additional preferred embodiment the monochromator assembly of the invention includes manually releaseable securing means for securing the collimator in a desired position in the support provided for the collimator.

The manually releasable securing means is preferably a detenting means.

DESCRIPTION OF THE PREFERRED EMBODIMENT

The following description of the preferred embodiment of the invention is made with reference to the Figures.

Figure 1:
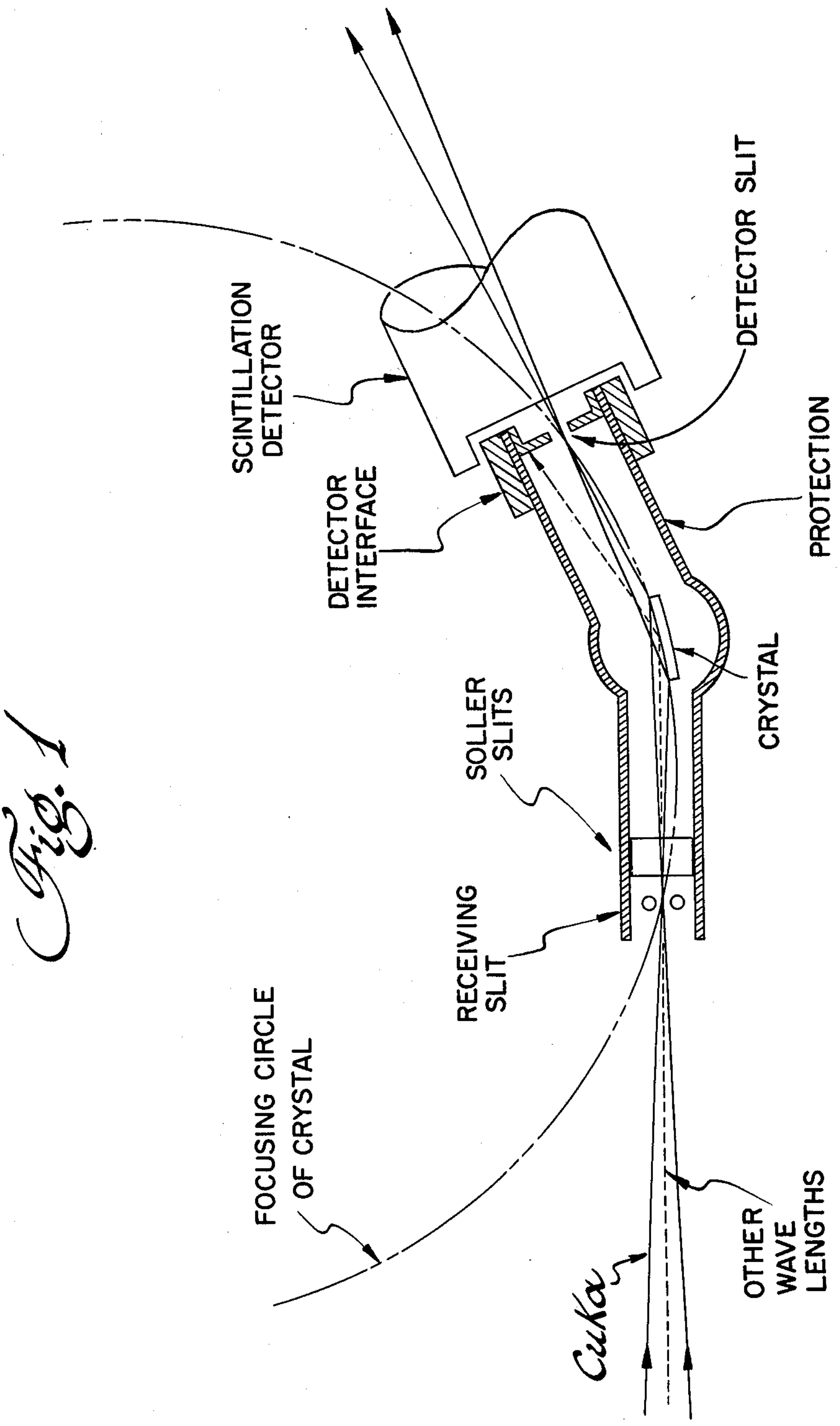
FIG. 1 is a schematic view of the optics of the monochromator assembly of the invention.

As shown in FIG. 1 polychromatic x-radiation containing for example CuK $\alpha$ radiation is directed by means of a receiving slit and the slits of a collimator such as a Soller collimator to a monochromator crystal where a single wavelength such as CuK α radiation is diffracted to a detector such as a scintillation detector.

Figure 3:
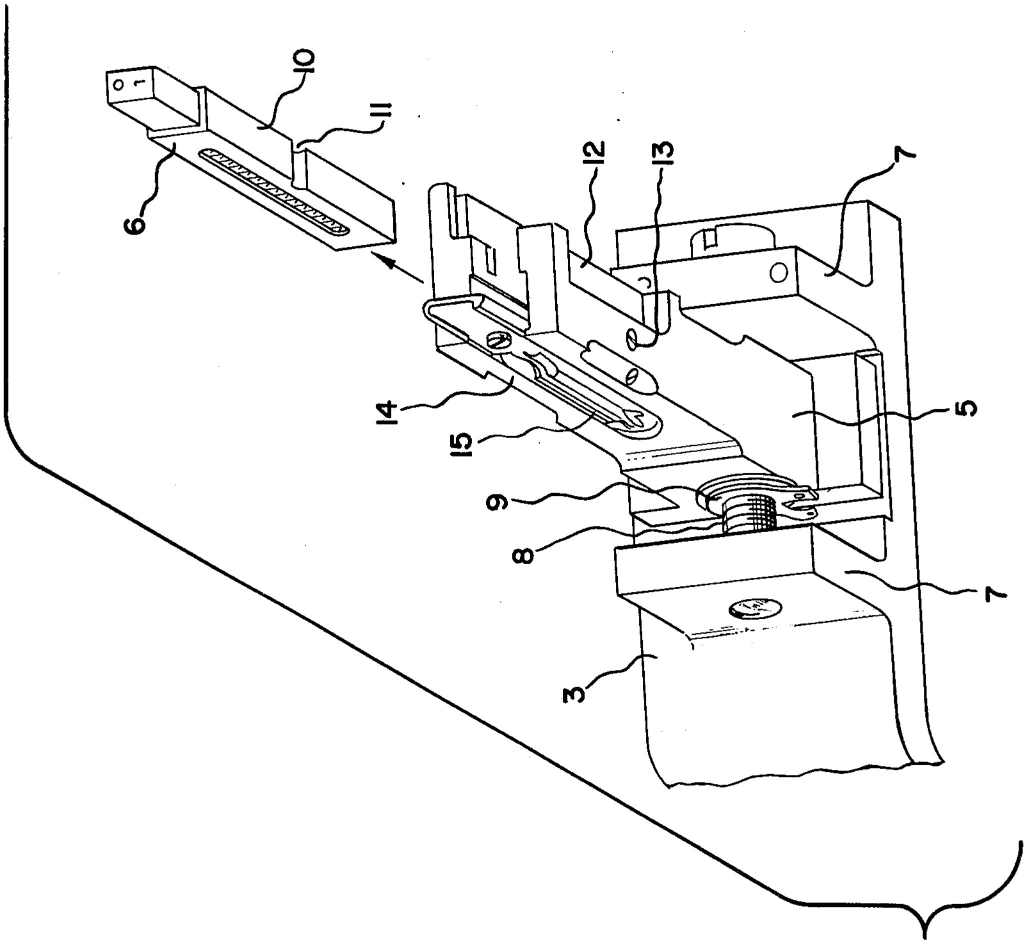
FIG. 3 is a perspective view of a preferred support for a collimator assembly and a receiving slit assembly utilized in the monochromator assembly of FIG. 2.
Figure 2:
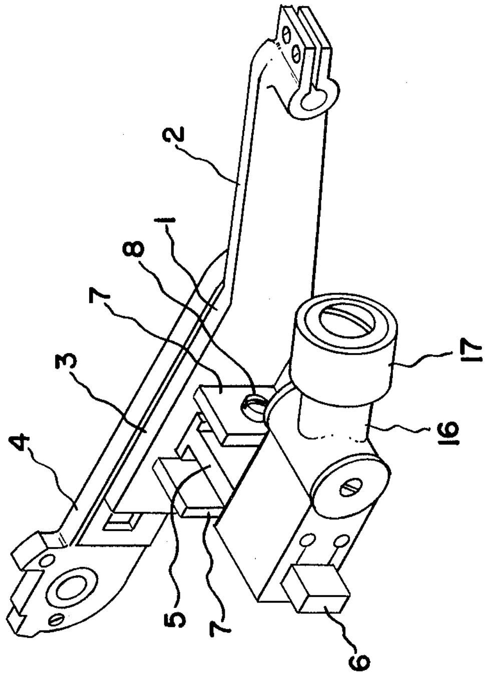
FIG. 2 is a perspective view of the monochromator assembly of the invention attached to 2 $\theta$ arm of a goniometer.

The structure of a preferred embodiment of the monochromator assembly of the invention, the optics of which are disclosed in FIG. 1 are as follows:

As shown in FIGS. 2 and 3, a base 1 formed of two essentially linear sections 2 and 3 is joined together at an oblique angle and is attached to the 2 θ arm of a goniometer 4 by an attachment which is not shown. Support 5 for a collimator, one form of which is a parallel plate assembly 6 such as a Soller collimator, extends traversely outwardly from the base 1 and is positioned between two upward posts 7, permanently fixed to base 1 of the monochromator assembly, by screw 8 and is movable between the posts 7 by rotation of the screw 8. The support 5 is locked in position by movable clip 9.

The collimator 6, the lower surface of which 10 has a detent receiving notch 11, is slid into channel 12 of support 5 and held in place through a spring loaded detented ball held in position by a screw only the head 13 of which is shown.

A receiving slit assembly 14 is held in place, in a similar fashion, in channel 15 in support 5.

A monochromator crystal, not shown, is positioned in support 16 which also extends transversely outwardly from base 1 and serves to monochromatize polychromatic x-radiation coming through the collimator 6. Monochromatized x-radiation then passes via detector coupler 17 to a detector which is not shown.

In order to evaluate the performance of the monochromator assembly of the invention a series of measurements were made on an α -SiO2 (Novaculite, Arkansas Stone) specimen. As a monochromator crystal, there was employed a pyrolytic graphite sheet 18×10×1 mm, Union Carbide Grade zya, bent to a radius of 223.5 mm.

As a collimator there was employed a Soller collimator comprising molybdenum foils spaced at 0.5 mm and having a total length equal to 5 mm.

The specimen was irradiated with x-radiation from a fine focus copper anode tube, 45 kV 40 mA. As the detector a scintillation detector and pulse height selection was employed.

Slow scans were made over the (100) reflection to establish profile distribution and absolute intensity plus over the quartz quintuplet (212), (203), (301) to establish resolution and intensity. Measurements were made with and without the monochromator. When the monochromator was employed the measurements were made both with and without the Soller collimator.

Table 1, which follows, shows the absolute count rates obtained on the α -SiO2 (100) reflection under various conditions. As will be seen from the table the use of the monochromator gives count rates comparable to that obtained with the beta-filter, that is about 20% less when the monochromator is used with the Soller collimator, and about 20% more when the monochromator is used with the Soller collimator.

TABLE 1

COMPARISON OF PEAK INTENSITY ON α —$SiO_2$ (100) REFLECTION WITH AND WITHOUT MONOCHROMATOR

| | | |
|---|---|---|
| (a) | No monochromator, no β-filter | 47,000c/s |
| (b) | No monochromator, with β-filter | 23,000c/s |
| (c) | With monochromator, no Soller collimator | 28,500c/s |
| (d) | With monochromator, Soller collimator in position | 17,800c/s |

All measurements done with fine focus copper anode tube, 45 kV 40 mA.
Scintillation detector with pulse height selection.

The effect of the removable Soller collimator on the profile shape is shown in Table 2. In this table measurements were made at 50, 30 and 10% of the peak intensity maximum. In each instance, the measurements were made to low and high angle sides of the 2 θ value corresponding to the peak intensity maximum.

As shown in the Table 2 the collimator has no significant effect on the high angle side of the profile shape. However, when the collimator is not employed there is a profile distortion on the low angle side which varies from a factor of about 1.1 at the 50% intensity point to 1.5 at 10%, in other words at the base of the profile.

TABLE 2

PROFILE MEASUREMENTS ON THE α —$SiO_2$ (100) REFLECTION

| | Low Angle Side | | High Angle Side | |
|---|---|---|---|---|
| | With Collimator | Without Collimator | With Collimator | Without Collimator |
| 50% | 13mm | 15mm | 7mm | 7mm |
| 30% | 19mm | 29mm | 9mm | 9mm |
| 10% | 36mm | 50mm | 13mm | 13mm |

It will be apparent that many modifications of the apparatus shown can be made without departing from the scope of the invention as defined by the following claims.

What is claimed is:

1. A focusing crystal monochromator assembly for receiving diffracted polychromatic x-radiation, monochromatizing said diffracted polychromatic x-radiation and focusing the resultant monochromatized x-radiation at a detector, said monochromator assembly comprising:

a collimator situated in the path of said polychromatic x-radiation for limiting the axial diversion of said polychromatic x-radiation and slidably removable from the path of said polychromatic x-radiation;

a monochromator crystal fixedly supported in the path of the collimatized polychromatic x-radiation produced by said collimator for directing monochromatized x-radiation toward an x-radiation detector;

a base, attachable to the 2 θ arm of a goniometer, having first and second substantially linear portions attached to each other and forming an oblique angle therebetween;

a first support member extending transversely outwardly from said base and having a channel for supporting the collimator in the path of said diffracted polychromatic x-radiation and slidably removable from said path;

a second support member extending transversely outwardly from said base for fixidly supporting the monochromator crystal in the path of the polychromatic x-radiation;

the said second support member being positioned between said first support member and a detector for detecting the polychromatic x-radiation monochromatized by said monochromator crystal.

2. The monochromator assembly of claim 1 wherein the collimator is a parallel plate assembly.

3. The monochromator assembly of claim 2, wherein said support member for said plate assembly comprises manually releasable securing means for securing said collimator plate assembly at a desired position in said channel.

4. The monochromator assembly of claim 3 wherein said manually releasable securing means comprises at least one detenting means.

5. The monochromator assembly of claim 4 wherein said detenting means is a spring loaded detented ball.

6. The monochromator assembly of claim 2 wherein a support member for a receiving slit assembly extends transversely outwardly from said base and has a channel for supporting a receiving slit assembly slidably removable from the path of said x-radiation.

7. The monochromator assembly of claim 6 wherein the support member for the receiving slit assembly is movable along said base.

8. The monochromator assembly of claim 7 wherein a single movable support member is employed for both the receiving slit assembly and the collimator.

9. The monochromator assembly of claim 7 wherein said movable support member is positioned between two post members rigidly secured to said base and is movable from one to the other of said post members along said base.

10. The monochromator assembly of claim 9 wherein the movable support member is secured to said post members by fastening means extending through said post members and said movable member.

* * * * *